Patented Sept. 13, 1932

1,876,897

UNITED STATES PATENT OFFICE

CHARLES F. FLEMMING, OF WILLOUGHBY, OHIO, ASSIGNOR TO THE OHIO RUBBER COMPANY, OF CLEVELAND, OHIO, A CORPORATION OF OHIO

PROCESS OF VULCANIZATION

No Drawing.   Application filed July 18, 1929.   Serial No. 379,332.

This invention relates to an improvement in the process of vulcanizing rubber.

The object of this invention is to increase the rate of vulcanization or to decrease the period of vulcanization of a rubber compound, thereby increasing the number of cures obtainable from an open steam vulcanizer, a steam curing press, or curing mold unit.

The process is effective for both hard and soft rubber or rubber having any degree of hardness, and tests show that the process does not, with either so-called soft or hard rubber, shorten the life of the product.

Numerous substances have been added to rubber in the past to accelerate the rate of vulcanization. The so-called inorganic accelerator, such as lime, zinc oxide, litharge, calcium carbonate, calcium oxide, etc., somewhat shortened the period of vulcanization, either by increasing the thermal conductivity of a compopnd, that is, the rate of flow of heat through its body from surface to surface, or by increasing the heat capacity of a compound, that is, the amount of heat that can flow into a body.

The so-called organic catalyzers, which not only make it possible to cure with lesser quantities of sulphur but also shortened the period of vulcanization, as their name indicates, act as a catalytic agent, catalyzing the action of the sulphur on the rubber.

The period of vulcanization can, of course, be shortened by increasing the heat conducted into the mass of the compound, through its exterior surfaces, by raising the temperature of the vulcanizer, press or mold in which it is being cured. This raising of temperature is, of course, limited by the wastefulness and impracticability of maintaining high boiler pressures and, therefore, undesirable.

The object of this invention is to create an internal heat within the mass of the compound, by mixing substances in the compound, which, when subjected to the heat of vulcanization, react with one another, liberating heat during their reaction, and thereby speed the rate of vulcanization. The result obtained is equivalent to raising the temperature of the press or mold in which the compound is being cured, except that the heat is already within the interior of the mass when the reaction is once started, thus very materially shortening the time of vulcanization, while in the case of application from the outside it must be conducted from the surfaces to the interior.

It is not my intention to confine this invention to any chemical or group of chemicals which liberate heat during their reactions when subjected to the heat of vulcanization, but to include all substances which are exothermic in their reactions with one another when subjected to the heat of vulcanization.

It has been found that a combination of ingredients, such as a suitable oxide having an affinity for water and an ingredient having water of crystallization which, when subjected to heat, react, so as to produce a hydrate and have a strong exothermic effect, and such ingredients when added to the rubber mix or compound will produce the novel results explained above. Various chemical ingredients and combinations of ingredients can be employed for this purpose. For example, I have found that calcium oxide (CaO) and Epsom salts ($MgSO_4.7H_2O$) are very effective for this purpose. The Epsom salts must be heated to 150° C. or 302° F. before any of the water of crystallization is driven off and can therefore be safely handled during the ordinary milling operation without danger of premature reaction with the calcium oxide.

Instead of the calcium oxide, sodium oxide (NaO) may be employed, and with either of these oxides, I may employ in place of Epsom salts any of the alums, such, for example, as ammonium alum $(Al_2(SO_4)_3(NH_4)_2 24H_2O)$ or sodium thiosulphite $(Na_2S_2O_3 5H_2O)$.

I have found that the combination of calcium oxide and Epsom salts or the combination of calcium oxide and ammonium alum work equally well and that both combinations are equally desirable from the cost standpoint.

The process as used by me is the same with any of the combinations of chemicals mentioned above, and in any case the proportions may be substantially the same. In carrying out my invention in its preferred form, the oxide, which may be assumed to be calcium oxide, is preferably pulverized in the presence of a vegetable oil, such as cotton seed oil, or a mineral oil, such as paraffine oil. By "in the presence of oil" I mean just enough oil to prevent the calcium oxide from combining with the moisture in the air during pulverization. A thin film of oil is thus provided over each minute particle of the oxide forming a kind of paste which is very easily dispersed through the compound in the mixing mill.

The oxide and the chemical containing the water of crystallization, which is also in finely divided form, may be mixed with any ordinary rubber compound containing, as usual, rubber, sulphur, filler, etc. While the proportions may be varied very materially, I have produced very good results by adding to 100 lbs. of the rubber compound about 8½ lbs. of Epsom salts (or about 9 lbs. of ammonium alum) and about 11½ lbs. of calcium oxide in the paste condition mentioned above. An excess of calcium oxide is immaterial and, in fact, preferred. The chemicals thus added to the compound are thoroughly and uniformly dispersed throughout the compound by mixing in a rubber mill in the manner familiar to one skilled in the art. After the rubber compound and the chemicals are thus thoroughly mixed, the compound or mixture is prepared by calendering, tubing, dieing, molding or in any of the ordinary ways known in the art, prior to vulcanization, depending upon the type of article desired in the finished product.

After thus being prepared, it is vulcanized at a temperature of not less than 150° C. or 302° F. (when Epsom salts is used), this heat, of course, being applied externally of the compound. With any other chemical containing water of crystallization, the temperature of the applied external heat should be at least as high as that required to drive off the water of crystallization. At this temperature, the water of crystallization is liberated from the Epsom salts, this water in turn reacting with the calcium oxide to form the hydrate, and liberating considerable heat during the reaction, causing the interior heat of the mass of the compound to be raised and thereby shortening the period of vulcanization.

I have found that the quantity of calcium oxide and Epsom salts, as mentioned above, will cut the period of vulcanization of a compound about 50% or in half when the curing temperature is about 302° F. Greater or lesser proportions can, of course, be used, depending upon the length of cure desired and limited by the quality, gum contents, etc. desired in the finished article.

There is an added advantage in this method of acceleration when the rubber article has an opening, or is hollow, requiring a core or mandrel in the mold to produce the hollow in the finished article, or where a metal or wood insert is molded inside the article. Here the conductivity is poor as in the ordinary vulcanizing process the heat is working or penetrating all from the outside toward the core or mandrels or insert, as the case may be.

Naturally, in a product of this kind there is a proportionately greater increase in the rate of vulcanization as the reaction sets off around the surface at 302° F. As this heat is conducted to the adjoining portion of the mass, the reaction there is set off, transmitting it still further inward until the whole mass is heated by the reaction. In other words, it is, in a way, spontaneous in its effect.

As before stated, I do not desire to be confined to the specific chemicals which are added to the rubber compound to produce the interior heating effect by their reactions on one another, nor do I wish to be confined to any specific proportions of the chemicals which are added, for, as above stated, the proportions can be very widely varied. The ingredients mentioned and the proportions stated are by way of example only and are not to be considered as limiting.

Having thus described my invention, I claim:

1. The method of reducing the period of vulcanization of a rubber compound which comprises mixing therein substances which are exothermic in their reactions, including a substance containing water of crystallization.

2. The herein described method of reducing the period of vulcanization of a rubber compound which comprises mixing therein ingredients having an exothermic reaction, including an ingredient containing water of crystallization, and subjecting the compound to that temperature at which the water of crystallization is driven off, thereby causing the water to react with another ingredient and liberate heat during the reaction.

3. The method of reducing the period of vulcanization of a rubber compound which comprises mixing therein substances which are exothermic in their reactions, including a substance which contains water of crystallization and which will liberate its water when heated to a point within the range of vulcanization temperatures.

4. The method of reducing the period of vulcanization of a rubber compound which comprises mixing therein an oxide having an affinity for water and an ingredient having water of crystallization.

5. The method of reducing the period of vulcanization of a rubber compound which comprises mixing therein an oxide having an affinity for water and Epsom salts.

6. The method of reducing the period of vulcanization of a rubber compound which comprises mixing therein an oxide having an affinity for water and an alum.

In testimony whereof, I hereunto affix my signature.

CHARLES F. FLEMMING.